3,479,406
CRYSTALLINE ALKYL DIMETHYL PSEUDO-CUMINYL AMMONIUM CHLORIDES

Reginald L. Wakeman, Philadelphia, Pa., assignor to Millmaster Onyx Corporation, New York, N.Y., a corporation of New York
No Drawing. Filed Aug. 16, 1966, Ser. No. 572,683
Int. Cl. C07c 87/30; A61k 27/00
U.S. Cl. 260—567.6
2 Claims

ABSTRACT OF THE DISCLOSURE

Crystalline, non-hygroscopic, water-soluble alkyl dimethyl pseudocuminyl ammonium chlorides wherein the alkyl contains 8 to 18 carbon atoms and especially useful as microbiocides having wide application in the treatment of water systems.

---

This invention relates to crystalline, non-deliquescent compounds of high microbiocidal potency, but which are, nevertheless, highly soluble in water.

Most highly microbiocidal quaternary compounds are either liquids or are in the forms of gels or soft, viscous solids which tend to easily absorb atmospheric moisture and to deliquesce. There are some microbiocidal quaternaries that are available in powdered form but they are light, fluffy powders, like dust. These are difficult to handle and package and are so easily carried by the air that they are irritating to the skin, eyes and mucous membranes of persons handling or using them. Some of the heretofore known powder quaternaries are salts of bromine and are, therefore, very costly.

Quaternary compounds have a wide field of application in the treatment of water systems such as in swimming pools, cooling towers, air-conditioners, paper-making, oil recovery, sterilization of drinking water for animals, etc. However, natural water supplies are often of the "hard" water type containing mineral salts. Many quaternary compounds which are effective in "soft" water are not nearly as effective in "hard" water because of the inhibition of the metal salts.

The compounds of the present invention overcome all of the aforementioned difficulties of prior quaternaries, in that the present compounds are crystalline, non-hygroscopic, yet extremely water soluble. They, furthermore, do not form "dusts" and are, therefore, easily handled, packaged and used without any ill effects on the body. In addition, they have been found to be highly effective both in "soft" and "hard" water and, since they are slow to dissolve, they may be applied in predetermined dosage forms and permitted to leach out gradually. The crystalline nature of the material also permits ready compression into tablets or briquettes, which are usually the easiest and safest mode of packaging, storing and handling. In the crystalline form it may be easily mixed with other granular material that may serve as either a synergistic agent, a carrier or a diluent.

In accordance with the present invention, the compounds which achieve the above objectives are the alkyl dimethyl pseudocuminyl ammonium chlorides wherein the alkyl contains $C_8$ to $C_{18}$ carbon atoms.

The present compounds are prepared by reacting the particular alkyl dimethyl amine with trimethyl benzyl chloride that has been obtained by the chloromethylation of pseudocumene (1,2,4-trimethyl benzene).

It is highly important that the preparation of the compounds take place in the absence of water in order to obtain crystalline material having the aforementioned desirable characteristics.

The following example is illustrative of the present invention, but is not intended to serve as a limitation thereof:

EXAMPLE

A round-bottom, three-necked flask, equipped with an agitator, reflux condenser and heater, was charged with 58 grams (0.255 mol) n-dodecyl dimethyl amine, 42.5 grams (0.25 mol) pseudocuminyl chloride and 250 grams acetone.

The pseudocuminyl chloride was derived from 1,2,4-trimethyl benzene by the well-known process of chloromethylation with formaldehyde and HCl, and was thereafter rectified.

The mixture was heated to the boiling point and then refluxed for a period of four hours, during which time it reacted to form the quaternary ammonium salt. On gradual cooling to 15° C., it crystallized and was filtered off to yield a yellowish crystalline mass. This mass was then further purified by two additional recrystallizations from acetone. The final yield was 68 grams (or 70% of the theoretical) of a n-dodecyl dimethyl pseudocuminyl chloride, in the form of sparkling white, free-flowing non-hygroscopic crystals. This material was found to be readily and freely soluble in water to more than 50% by weight of the water.

The product produced in the above manner assayed 99.5% pure, containing 0.97% water, as determined by the Karl Fischer method, and melted at 166°–168° C.

Instead of acetone, other non-aqueous solvents can be used, as for example, methyl, ethyl or isopropyl alcohol, propylene glycol, dioxane, dimethyl formamide, dimethyl sulfoxide, or any other feasible non-aqueous solvent.

The compound prepared in the above manner was tested biocidally by means of the Association of Official Agricultural Chemists Use-Dilution Method, indicative of actual disinfection use levels for hard surfaces (this being the prescribed, standard regulatory test procedure) against *Staphylococcus aureus* and *Salmonella choleraesuis*. It demonstrated perfect passing performance at 350 parts per million of active quaternary.

The Association of Official Agricultural Chemists Germicidal and Detergent Sanitizers Method was also used. This determines the minimum concentration of germicide which can be permitted for use in sanitizing hard, non-porous surfaces, and also determines the maximum water-hardness tolerances for recommended concentrations. According to this test, at 200 parts per million concentration, the product demonstrated good germicidal performance in the presence of water that contained magnesium and calcium at 600 parts per million hardness measured as $CaCO_3$.

Although normal dodecyl dimethyl pseudocuminyl ammonium chloride has been illustrated above, it is to be understood that all alkyl dimethyl pseudocuminyl ammonium chlorides wherein the alkyl contains from 8 to 18 carbon atoms, may be prepared in the same manner and are effective generally for the same purposes.

Obviously, many modifications of the present invention are possible in the light of the above teachings. It is, therefore, to be understood that within the scope of the appended claims, the invention may be practiced otherwise than as specifically described.

The invention claimed is:
1. Crystalline alkyl dimethyl pseudocuminyl ammonium chloride wherein the alkyl contains 8 to 18 carbon atoms.

2. The compound of claim 1 wherein the alkyl is n-dodecyl.

References Cited

UNITED STATES PATENTS

| | | | |
|---|---|---|---|
| 2,676,986 | 4/1954 | Wakeman et al. | 260—567.6 |
| 2,700,683 | 1/1955 | Tesoro et al. | 260—567.6 |
| 2,772,310 | 11/1956 | Morris | 260—567.6 |
| 2,918,401 | 12/1959 | Copp | 260—567.6 XR |
| 3,038,004 | 6/1962 | Copp et al. | 260—567.6 XR |
| 3,200,143 | 8/1965 | Copp | 260—567.6 XR |
| 3,285,959 | 11/1966 | McFarlane | 260—567.6 |

FLOYD D. HIGEL, Primary Examiner

U.S. Cl. X.R.

210—64, 62; 260—651; 424—329